(12) United States Patent
Goertler et al.

(10) Patent No.: US 9,098,840 B2
(45) Date of Patent: Aug. 4, 2015

(54) SYSTEM AND METHOD FOR PROVIDING AND ACTIVATING SOFTWARE LICENSES

(75) Inventors: Georg Goertler, Baiersdorf (DE); Torsten Horst Ludwig Schmidt, Röttenbach (DE); Peter Haeuser, Effeltrich (DE); Ali-Nejat Bengi, Erlangen (DE); Rainer Alfred Kuth, Höchsadt (DE)

(73) Assignee: Siemens Aktiengesellschaft, München (DE)

( * ) Notice: Subject to any disclaimer, the term of this patent is extended or adjusted under 35 U.S.C. 154(b) by 1930 days.

(21) Appl. No.: 11/843,262

(22) Filed: Aug. 22, 2007

(65) Prior Publication Data

US 2009/0055320 A1    Feb. 26, 2009

(51) Int. Cl.
*G06F 21/00*    (2013.01)
*G06Q 20/12*    (2012.01)
*G06F 19/00*    (2011.01)
*G06F 21/10*    (2013.01)

(52) U.S. Cl.
CPC .......... *G06Q 20/1235* (2013.01); *G06F 19/328* (2013.01); *G06F 21/10* (2013.01)

(58) Field of Classification Search
USPC .................................. 705/2, 59, 51
See application file for complete search history.

(56) References Cited

U.S. PATENT DOCUMENTS

| | | | | |
|---|---|---|---|---|
| 5,258,906 A * | 11/1993 | Kroll et al. | ......................... | 705/2 |
| 5,742,718 A * | 4/1998 | Harman et al. | .................. | 385/53 |
| 5,745,879 A * | 4/1998 | Wyman | ......................... | 705/1.1 |
| 5,822,544 A * | 10/1998 | Chaco et al. | ...................... | 705/2 |
| 5,892,900 A * | 4/1999 | Ginter et al. | ...................... | 726/26 |
| 5,960,085 A * | 9/1999 | de la Huerga | ................ | 340/5.61 |
| 5,987,519 A * | 11/1999 | Peifer et al. | ..................... | 709/230 |
| 6,272,481 B1 * | 8/2001 | Lawrence et al. | ................ | 706/45 |
| 6,302,844 B1 * | 10/2001 | Walker et al. | ................. | 600/300 |
| 6,480,762 B1 * | 11/2002 | Uchikubo et al. | ............. | 700/253 |
| 6,558,321 B1 * | 5/2003 | Burd et al. | ..................... | 600/300 |
| 6,581,069 B1 * | 6/2003 | Robinson et al. | ............. | 707/648 |
| 6,631,353 B1 * | 10/2003 | Davis et al. | ....................... | 705/2 |
| 6,638,218 B2 * | 10/2003 | Bulat | .......................... | 600/300 |
| 6,804,558 B2 * | 10/2004 | Haller et al. | ..................... | 607/30 |
| 6,829,704 B2 * | 12/2004 | Zhang et al. | ...................... | 713/1 |
| 6,901,371 B1 * | 5/2005 | Koritzinsky et al. | .............. | 705/2 |
| 6,958,706 B2 * | 10/2005 | Chaco et al. | ............. | 340/870.11 |
| 6,966,000 B2 * | 11/2005 | Zhang et al. | ...................... | 726/22 |
| 7,065,508 B2 * | 6/2006 | Schull | ............................ | 705/59 |
| 7,085,743 B2 * | 8/2006 | Schull | ............................ | 705/59 |
| 7,089,212 B2 * | 8/2006 | Schull | ............................ | 705/59 |
| 7,092,908 B2 * | 8/2006 | Schull | ............................ | 705/51 |
| 7,149,773 B2 * | 12/2006 | Haller et al. | ................... | 709/203 |
| 7,181,505 B2 * | 2/2007 | Haller et al. | ................... | 709/219 |
| 2001/0032098 A1 * | 10/2001 | Kulkarni | ........................... | 705/2 |
| 2001/0039504 A1 * | 11/2001 | Linberg et al. | .................... | 705/3 |
| 2001/0051765 A1 * | 12/2001 | Walker et al. | ................. | 600/300 |
| 2002/0004785 A1 * | 1/2002 | Schull | ............................ | 705/51 |
| 2002/0007294 A1 * | 1/2002 | Bradbury et al. | ................. | 705/7 |
| 2002/0022971 A1 * | 2/2002 | Tanaka et al. | ..................... | 705/1 |
| 2002/0161990 A1 * | 10/2002 | Zhang et al. | ...................... | 713/1 |
| 2003/0023460 A1 | 1/2003 | Ackermann et al. | | |
| 2003/0093299 A1 | 5/2003 | Kuth et al. | | |

(Continued)

*Primary Examiner* — Zeshan Qayyum
(74) *Attorney, Agent, or Firm* — Lempia Summerfield Katz LLC

(57) ABSTRACT

Methods and features for providing and activating a software license in a system, such as a magnetic resonance system, are disclosed. For example, a software license is stored in the system. The system with the stored software license is sold or rented to a client. The software license is operable to be activated by or at the client.

25 Claims, 3 Drawing Sheets

(56) References Cited

U.S. PATENT DOCUMENTS

| | | | |
|---|---|---|---|
| 2004/0215571 A1* | 10/2004 | Schull | 705/59 |
| 2005/0049973 A1* | 3/2005 | Read et al. | 705/59 |
| 2005/0060268 A1* | 3/2005 | Schull | 705/59 |
| 2005/0075906 A1* | 4/2005 | Kaindl et al. | 705/2 |
| 2005/0102238 A1* | 5/2005 | Schull | 705/59 |
| 2006/0069652 A1* | 3/2006 | Ebihara et al. | 705/59 |
| 2008/0026352 A1* | 1/2008 | Socher | 434/262 |

* cited by examiner

SYSTEM AND METHOD FOR PROVIDING AND ACTIVATING SOFTWARE LICENSES

BACKGROUND

The present invention relates to software licenses. In particular, a medical system and a variety of procedures for providing and activating software licenses for the medical system are provided.

Medical equipment is rented or purchased for diagnostic, treatment, and research purposes. For example, medical imaging equipment is shipped and delivered to a variety of locations, such as hospitals, research laboratories, and clinics. Medical imaging includes, but is not limited to, magnetic resonance tomography ("MRT") or imaging ("MRI"), positron emission tomography ("PET"), and computed tomography ("CT") as well as hybrid modalities.

Software applications are utilized to run and monitor the medical equipment. For example, sophisticated imaging software is used to create images of internal features of humans, animals, and other objects. A variety of software applications provided by the vendor of the medical equipment or separate software vendor may be installed in the medical equipment.

A license may govern the utilization of the different software applications by a customer or client. Therefore, the customer or client is required to obtain a license for a desired use of a desired software application. After the customer or client receives the medical equipment, identification information of the equipment is obtained. The client or customer then contacts the vendor of the equipment and/or software and provides the identification information. An administrator at the vendor generates a software license for the specific software application and desired use of the software application. After the software license is generated, the license is transferred to the client, for example, through a remote connection. However, requesting a license, generation of the license, and transferring the license may become tedious.

BRIEF SUMMARY

By way of introduction, the preferred embodiments described below include a medical system and methods of providing and activating software licenses for the medical system. A license is stored in the medical system, and the stored license can be activated when or after a client receives the medical system.

In a first aspect, a computer-readable medium has stored therein instructions executable by a processor of a medical system. The instructions comprise activating a software license in the medical system. The software license is stored in the medical system prior to receiving the medical system by a client. Use of a software application associated with the software license is determined. A bill based on the use is generated.

In a second aspect, a method for providing a software license is provided. A software license is stored in a medical system. The medical system with the stored software license is sold or rented to a client. The software license is operable to be activated by or at the client.

In a third aspect, a method for activating a software license in a system is provided. A system is received. The system includes a stored software license. The software license stored in the system is activated.

The present invention is defined by the following claims, and nothing in this section should be taken as a limitation on those claims. Further aspects and advantages of the invention are discussed below in conjunction with the preferred embodiments.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

In a complex medical system, such as a MRI system, generation of a license, such as a trial license, in response to a request from a client, customer, or lessee (hereinafter referred to as "client") can be avoided. For example, a plurality of software licenses corresponding to several respective software applications of the medical system are stored in the medical system before shipping. The software licenses then can be activated, locally, by the client at any time after the client receives the medical system. Adapted activation of a license can be done between a vendor of hardware and/or software (hereinafter referred to as "vendor") and the client by means of additional synchronizing mechanisms. Also, training material in regards to the software applications are provided via computer based training ("CBT") or an application specialist, and the training provided may be synchronized with the activation of licenses.

Figure 1:
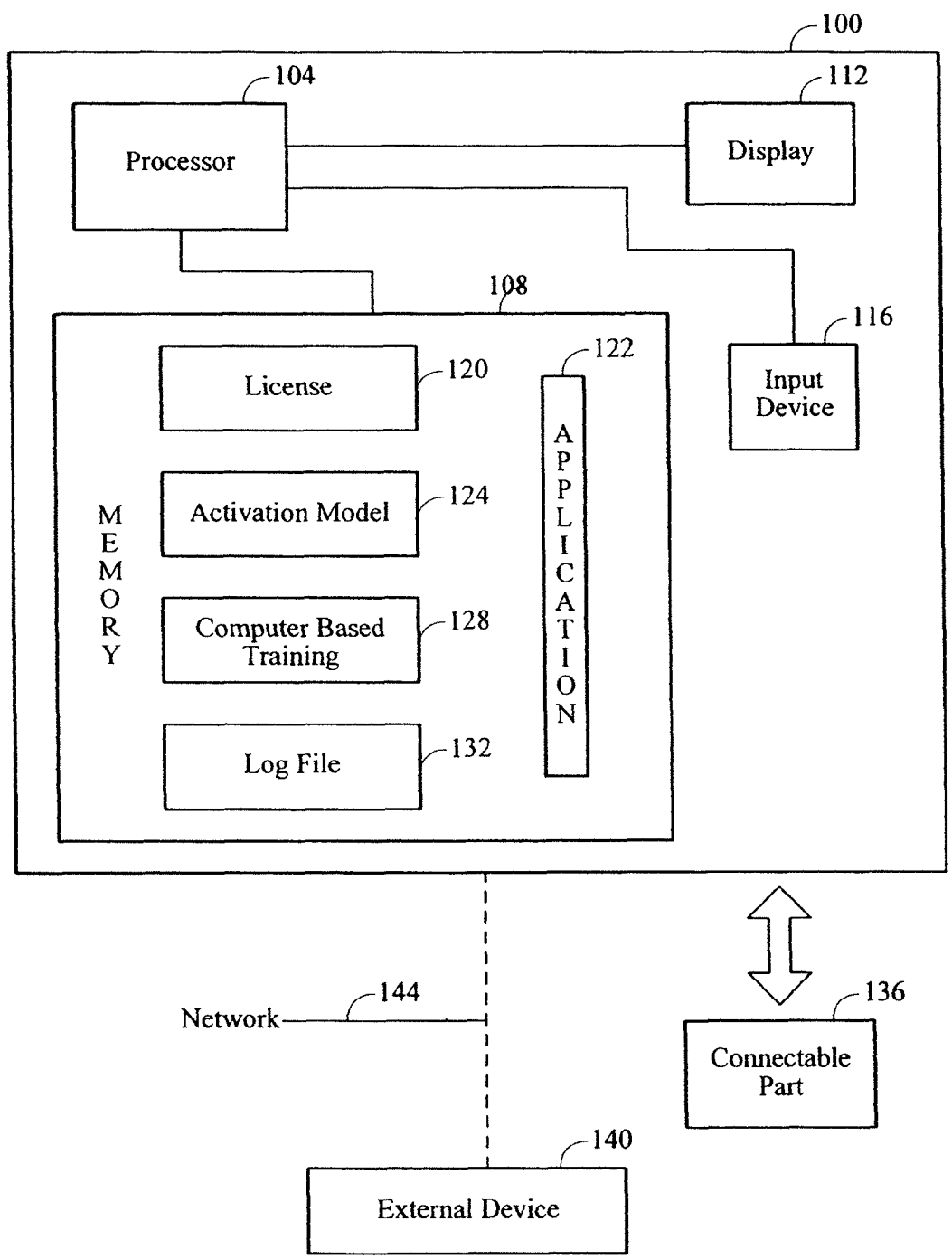
FIG. 1 is a diagram of one embodiment of a system, such as a medical system.

FIG. 1 shows one embodiment of a system 100. The system 100 is any known or future medical imaging system. For example, the medical system is a MRI or MRT scanner, a computed tomography scanner, an ultrasound scanner, a PET scanner, a SPECT scanner, a x-ray-angiography scanner, magnetically guided capsule endoscopy system, or any diagnostic or therapeutic medical system. Alternatively, the system 100 may be any computer based or processor based system operable to execute software governed by software licenses, including non-medical systems or medical imaging workstations.

The system 100 includes, but is not limited to, a processor 104, a display 112, an input device 116, and a memory 108. Additional, different, or fewer components may be provided. For example, additional hardware is provided, such as storage devices, coils for generating a fundamental magnetic field, a gradient coil system for generating independent, mutually perpendicular magnetic field gradients, a high frequency antenna for generating excitation pulses and/or for receiving magnetic resonance signals, an evaluation system, a power supply, and a cooling system.

Also, a connectable part 136 is any hardware that can be connected to the system 100. The connectable part is an additional part or a replacement part. For example, the connectable part is a specialized, custom, or replacement coil used for routine, complex, or advanced imaging techniques and processes.

The processor 104 is in communication with the display 112, the input device 116, and the memory 108. The processor 104 may be in communication with more or fewer components. The processor 104 is a main processor, such as a microprocessor, or a plurality of processors operable to communicate with electronics of the system 100. The processor 104 is operable to control and execute the various electronics, logic, and software applications of the system 100.

The display 112 is any mechanical and/or electronic display positioned for accessible viewing. For example, the display 112 is a liquid crystal display, ("LCD"), printer, or cathode ray tube ("CRT") monitor. The display 112 includes a plurality of pixels operable to show two dimensional ("2D"), three dimensional ("3D"), and/or four dimensional ("4D") images (i.e., the fourth dimension is time, and, therefore, 4D images are a sequence of images that show an object over a time period). The input device 116 includes, but is not limited to, a button, a keyboard, a rocker, a joy stick, a trackball, a voice recognition circuit, a mouse, or any other input device for sending commands.

The memory 108 is any known or future storage device. The memory 108 is one or a plurality of non-volatile and/or volatile memories, such as a Random Access Memory "RAM" (electronic), a Read-Only Memory "ROM" (electronic), or an Erasable Programmable Read-Only Memory (EPROM or Flash memory). The memory 108 includes, but is not limited to, a software license 120, an activation model 124, computer based training ("CBT") 128, a log file 132, and a software application 122. Additional, different, or fewer components may be provided. For example, the CBT 128 may not be provided. Alternatively, the components may be stored in different storage devices internal or external to the system 100.

The software license 120 governs the utilization of the software application 122. For example, the software license 120 is one or a plurality of software licenses that are machine/system dependent or specific comprising the permissions, rights, and restrictions imposed on the respective software application 122. Alternatively, the software license 120 is not machine/system dependent or specific. One software license 120 may govern one or more software applications 122. Under the software license, the client of the medical system, i.e., the licensee, is permitted to use the software application 122 in compliance with the specific terms of the license 120. The license 120 is a trial license, a permanent license, a license for lease, and/or a service license. A trial license is a license that allows a user to sample the software application 122. The trial license is provided at a discount rate or free of cost to the client. The trial license may limit the use of the software application by limiting the use of specific features or limiting the use of time of the software application 122. A permanent license is a license that is purchased at a one time cost or through installments. A permanent license does not place the limitations of a trial license on the use of the software application 122. A license for lease is a license the client can rent at a fixed or variable rate. A service license is a license that corresponds to service software used for troubleshooting, and the service license generally is a license for lease or a license that is limited in time. Alternatively, the software license 120 is a general license that can be activated as a trial license, a permanent license, a license for lease, and/or a service license.

For example, a license is a document containing encrypted information about the kind or type of the license, the system for which the license is allowed (dongle or Ethernet card number), start and/or end dates of the license, as well as activation models, described below, allowed for this license (pay-per use, trial license, time restrictions, other limitations (try n-times), or if a training is necessary prior to activation, kind of training (online or offline)). A license includes activation information or the system has knowledge about the activation information and restricts the use of a license if the activation information is missing. The base of a license is an individual serial number of a dongle, which may be connected to an external interface, carrying a serial number or a unique host ID generated out of special or standard components, serial numbers, or ID's built into a computer. Each software module or application, which requires separate rights to be used (the rights are typically dedicated to a special application) carries a type-number. During the proof of the license on a system, the central software contains an algorithm that reads the type-number of a software-module or application and the serial number and then outputs a license-number and checks whether the license-number is available at a certain memory location in the computer or system. If the license number is not available, the user cannot operate the software-module or application. Optionally, the algorithm takes into account the current date and a range of lifetime for the license.

A license in the system may not allow the use of any application unless an activation procedure (described in more detail below) is applied. The activation adds information to the license itself. Alternatively, a license is treated or governed by an activation security unit. The activation security unit monitors and is aware of some or all activated licenses in the system and will control an application by the activation model for the license (e.g., a trial license with activation only for a limited time (one month) or limited activation (only 10 times), or a license based on pay-per use (count of activations and billing activations).

The software application 122 is one or a plurality of medical imaging or service software applications. For example, the software application 122 comprises medical imaging applications, such as 3D distortion correction applications, advanced cardiac applications, 3D evaluation applications, diffusion applications, fly through applications, perfusion applications, soft tissue motion applications, vessel applications, and spectroscopy evaluation applications. Alternatively, the software application 122 is a service application used to troubleshoot errors or problems with hardware and/or software of the system 100.

The activation model 124 is one or a plurality of procedures used to activate the software application 122. The activation model is software or logic stored in the system 100 or another device that validates, confirms, and/or allows the completion of steps of a predetermined model. For example, the activation model 124 allows a client, a vendor, a training specialist, the system 100, the client and vendor, or the client and training specialist to activate the software license 120.

The CBT 128 is software that, for example, provides a tutorial or training to the client on how to use the software application 122. The training may involve examples of how to configure keys and protocols, how to view images at different orientations, how to develop reports, and how to utilize different features of the software application 122. The log file 132 is a database that stores information of various actions and entities. For example, the log file 132 may store personal patient information, date and time information, activation indications, activation model information, license information, a number of patients, a number of examinations, a type of use, a number of analysis reports, and/or a number of software starts associated with using the software application. Information stored on the log file 132 is used to generate a bill, used in conjunction with activation of the software license 120, and/or used to keep records for the client and/or vendor.

The system 100 is in communication with an external device 140 via a network 144. The external device is another medical system, a display, a database, a server, or a computer system that, for example, can be used to remotely view, provide feedback, or control the actions, examinations, history, or any other information of the system 100. For example, the external device 140 is used to generate bills based on the use of the software application 122 governed by the license 120. The network 144 is a cable, wire connection, wireless connection, an intranet, the Internet, and/or an intranet connected to the Internet.

Figure 2:
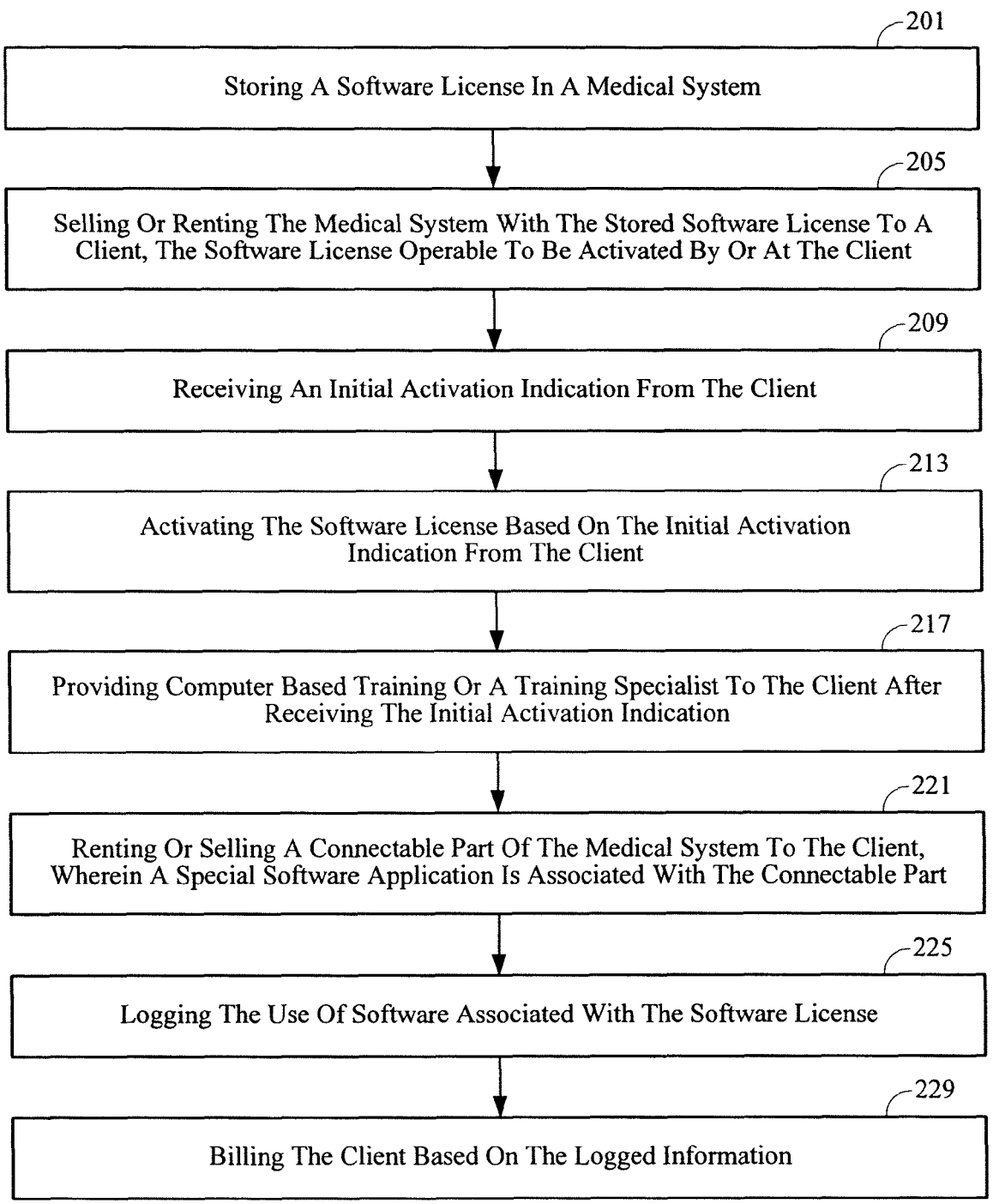
FIG. 2 is a flowchart of one embodiment of a method for providing a software license in regards to a system, such as the system of FIG. 1.

FIG. 2 shows one embodiment of a method for providing a software license in regards to a system, such as the system 100. In act 201, a software license, such as the software license 120, is stored in the system, such as a medical system or non-medical system. The software license is stored by a vendor of the system and/or a vendor of a software application, such as the software application 122, corresponding to the software license. Alternatively the software license is stored by a third party or any other entity.

In act 205, the system with the stored software license is sold or rented to a client, and the software license is operable to be activated by or at the client. For example, the client purchases the system at a one time cost or through installments. Alternatively, the client rents the system for any number of days, weeks, months, or years. The details of renting or purchasing the medical system are covered in a rental agreement or contract. Communications between a vendor and a client in regards to renting or purchasing the system and a rental contract may be accomplished via in-person dialogue, email, telephone, facsimile, and/or computer web page. The system is transported to the client site by land vehicle, such as a truck, train, boat, airplane, helicopter, or any other transport.

After the client receives the system, there are several ways of activating the stored software license. For example, the client views an option of activation models, such as the activation model 124, on a display, such as the display 112. For example, the options allows a client to choose from activating the software license by client only activation, system activation, client and vendor activation, training specialist only activation, and/or client and training specialist activation. Fewer or more choices may be provided. Alternatively, the client is not given the option to choose an activation model, and a predetermined activation model is utilized.

In regards to a client only activation model, the client receives a license key or password with, before, or after receiving the system, such as a medical system. The license key or password is numeric, alphabet based, alpha numeric code, key sequence, or other code that is digitally supplied to the client, physically printed on a tangible medium, or transmitted through a voice or sound medium, such as a phone or speaker. For example, the license key or password is printed on a card or paper accompanying the medical system. Alternatively, the license key or password is emailed to the client after receiving or turning on the medical system, or the license key or password can be retrieved from a database via an Internet and/or intranet connection, such as the network 144. Using an input device, such as the input device 116, the client enters or inputs the license key or password in the medical system to activate the software license. In regards to a client only activation model, the medical system may not need a remote connection.

Upon activation, the client is able to use the software application governed by the software license. The license key or password is used to activate a trial license, a permanent license, a license for lease, and/or a service license. Alternatively, the license key or password is set to activate a stored general license to a predetermined use level. For example, the license key or password is designed to activate a trial license. When the client enters or inputs the license key or password, the general license is activated only as a trial license. Therefore, the utilization of one or more software applications associated with the trial license may be limited to time of use, a limited number of patients, a limited number of examinations, a limited type of use, or a limited number of analysis reports.

In regards to system or medical system activation, the system, such as the system 100, can activate one or more software licenses automatically after the client receives the system. For example, a medical system is programmed to activate any variety of software licenses discussed above when the client turns on or powers up the medical system. Alternatively, the medical system may activate the software license when other phenomena occur, such as entering patient information or setting the medical system for a first examination. The type of software license to be automatically activated may be based on the purchase or rental contract between the vendor and the client. The medical system is programmed to activate a software license for a specified time period, such as for a few hours, a day, a week, or a month. Alternatively, the medical system is operable to activate and deactivate a software license at certain period of times. For example, the medical system activates a trial license on a daily basis for use during business hours Monday through Friday, and the software license is deactivated during other times. In regards to medical system activation, the medical system may not need a remote connection.

In regards to a client and vendor activation, the client and the vendor both use a separate license key or password. In act 209, an initial activation indication is received from the client. For example, the client receives a license key or password as described above. When the client enters or inputs the license key or password, an initial activation indication is sent to the vendor. The initial activation is received at a vendor via a vendor accessible database, email, or any other electronic or computer notification. For example, a digital code or flag bit is transmitted to the vendor via a remote connection, such as the network 144. The initial activation indication notifies the vendor that the client would like to activate the software license.

In act 213, the software license is activated based on the initial activation indication from the client. For example, after receipt of the initial activation, the vendor, such as an administrator at the vendor, enters or inputs a second license key or password that is remotely sent to the medical system. After the medical system receives the second license key or password, the client is able to use the software application governed by the software license. Alternatively, the same license key or password is used by both the client and vendor. Or, the client notifies the vendor of a desired activation without the use of a license key or password.

Activating the software license can be synchronized with training on the software application. In act 217, CBT, such as the CBT 128, or a training specialist is provided to the client after the vendor receives the initial activation indication, as in act 209, or at another time. For example, a training specialist from the vendor is scheduled to meet with the client at the client site. The training specialist gives a personal tutorial of the software application corresponding to the software license. The training specialist provides examples of use of the software application as well as helpful tips, and the training specialist may oversee use of the software application by the client and provide guidance and constructive criticism. While training, the training specialist may use a software CD, DVD, or program that can be installed in the medical system for training purposes only. Alternatively, the training specialist can activate a training license to be able to use the software for training purposes. The training license is stored in the medical system before shipping to the client, the training license is installed in the medical system at a later time, or a general software license stored in the medical system is operable to be activated as a training license.

Instead of sending a training specialist, the vendor can send CBT via a remote connection, such as the network 144. For example, when the vendor receives the initial activation indication, the CBT is automatically transmitted to the client. Alternatively, the CBT is transmitted to the client at a later time based on approval of the vendor. Or, the CBT is already stored in the medical system, and vendor notification is not needed. The CBT provides a step-by-step tutorial on how to use the software application associated with the software license. The CBT may provide a sample software application for the client to train on, or the CBT may be able to automatically activate a training license or provide a training license key or password to the client.

After training either via the training specialist or the CBT, the software license is activated based on the client's use level. For example, if the client desires a trail license, then the trial license is activated, and if the client desires a permanent license, the permanent license is activated. The training specialist or the CBT can provide a license key or password to the client, and the client can activate the software license using the license key or password. Alternatively, the training specialist or the CBT activates the software license after the training.

Alternatively, instead of using a license key or password to send the initial activation indication to the vendor, the client can contact the vendor to request training after receiving the medical system. For example, the client may call or email the vendor to setup up a training schedule with a training specialist or request the CBT. In this case, the medical system may not need a remote connection.

In act 221, a connectable part, such as the connectable part 136, of the medical system is sold or rented to the client, and a special software application is associated with the connectable part. In addition to selling or renting the medical system to the client, the vendor sells or rents replacement or additional parts to the client. The details and conditions of the replacement or additional parts may be represented in the original medical system contract or a new contract between the vendor and the client. The connectable part is, for example, a coil for a MRI system or any other connectable part for a medical system. The software associated with the connectable part may be customized or advanced software that is stored in the medical system before shipping the medical system to the client. Alternatively, the software is sent to the client with the connectable part in a CD or DVD format. Or, the software is remotely sent to the client before, after, or while the connectable part is sent to the client. A software license accompanies the software for the connectable part, and the software license is automatically activated when the software is installed. Alternatively, the software license is provided and activated using any technique discussed above for the client to use the software for the connectable part. Also, all or some of the training procedures mentioned above apply to the connectable part and the associated software as well.

In act 225, the use of software associated with the software license is logged. For example, after the software license is activated, all the use of the software by the client is logged in a log file, such as the log file 132. Alternatively, the client activity is logged on an external database, such as the external device 140. The use of the software includes, but is not limited to, a time period of use, the type of examinations, and the number of patients. In act 229, the client is billed based on the logged information.

Figure 3:
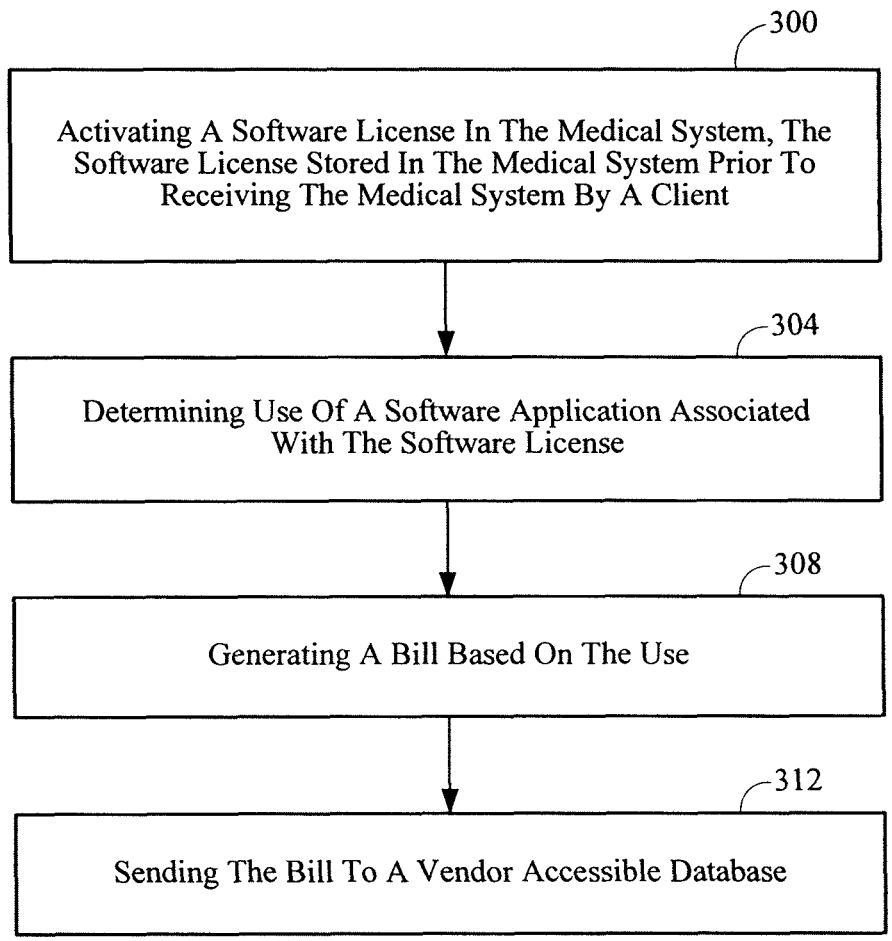
FIG. 3 is a flowchart of one embodiment of instructions that can be executable by a processor of a system, such as the system of FIG. 1.

In regards to billing the client, for example, FIG. 3 shows one embodiment of instructions that can be executable by a processor, such as the processor 104, of a medical system, such as the system 100. The instructions are stored in a computer-readable medium. In act 300, a software license in the medical system is activated, and the software license is stored in the medical system prior to receiving the medical system by a client. Any of the procedures or techniques described above may be utilized to activate the software license.

In act 304, use of a software application associated with the software license is determined. The determination of the use may include retrieving stored information from a log file, such as the log file 132, or an external device, such as the external device 140. Alternatively, the determination of the use may occur in substantially real time. The determination of the use includes, but is not limited to, determining a time period of use of the software application and/or determining a number of patients, a number of examinations, a type of use, a number of analysis reports, or a number of software starts associated with using the software application.

In act 308, a bill is generated based on the use. For example, the bill is generated by calculating a cost. The client may be charged a flat rate based on the time of use of a software application, or the client may be charged different rates based on different features used in the software application. Alternatively, the client is charged based on a number of actions, such as the number of examinations, the number of patients, and/or a number of software starts. Calculating a cost is also dependent on whether the software license is activated as a trial license, a service license, a license for lease, or a permanent license. For example, if the software license is activated as a trial license, then the client is not be billed for any use of the software application or the client is billed at a discounted rate. However, if the software license is activated as a permanent license, then a one time bill is generated upon activation or an installment of payments is initiated upon activation. If the software license is activated as a service license or a license for lease, then the client is billed based on the use of the software. A separate or combined bill or cost for training may also be provided.

In act 312, the bill is sent to a vendor accessible database, such as the external device 140. For example, after a bill is generated, the medical system transmits the bill information to a webpage or internet database via a network, such as the network 144, where the vendor can view or check the cost the client has incurred. Alternatively, the bill is generated at the vendor. The bill may be continuously or periodically updated. For example, the bill is updated substantially in real time. Or, the client is billed on a set time of use, and the vendor sends a hardcopy or electronic bill to the client. In this case, the medical system may not need to be remotely connected.

The instructions can implement any of the methods, acts, and processes described above. The instructions for implementing the processes, methods and/or techniques discussed above are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU or system.

Any of the features, methods, techniques described may be mixed and matched to create different systems and methodologies. In alternate embodiments, the methods and features described above may be implemented between entities other than just a vendor and a client. For example, the methods described above are utilized between multiple vendors of hardware and/or software or between non-vendor owners of hardware and/or software licenses and clients or sub-lessees.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. In a non-transitory computer-readable medium having stored therein instructions executable by a processor of a medical system, the instructions comprising:
    storing a software license in the medical system prior to a client receiving the medical system, wherein the software license governs the utilization of an associated software application stored in the medical system;
    receiving, by the processor, information;
    determining, by the processor, that the received information is patient information;
    activating the software license in the medical system based on the determination that the information is patient information;
    determining, by the processor, use of the associated software application stored in the medical system;
    calculating, by the processor, a cost based on the use of the associated software application stored in the medical system; and
    generating a bill based on the calculated cost.

2. The non-transitory computer-readable medium of claim 1, wherein the instructions further comprise:
    sending the bill to a vendor accessible database.

3. The non-transitory computer-readable medium of claim 1, wherein determining the use comprises determining a time period of use of the software application.

4. The non-transitory computer-readable medium of claim 1, wherein determining the use comprises determining a number of patients, a number of examinations, a type of use, a number of analysis reports, or a number of software starts associated with using the software application.

5. The non-transitory computer-readable medium of claim 1, wherein generating the bill comprises calculating a cost based on whether the software license is activated as a trial license, a service license, a license for lease, or a permanent license.

6. A method for providing a software license, the method comprising:
    storing a software license in a medical system, wherein the software license governs the utilization of an associated software application stored in the medical system;
    selling or renting the medical system with the stored software license to a client, the software license operable to be activated by or at the client;
    receiving, by the medical system, information;
    determining, by the medical system, that the received information is patient information;
    logging, by the medical system, the use of the associated software application stored in the medical system;
    calculating, by the medical system, a cost based on the logged use of the associated software application stored in the medical system; and
    billing the client based on the calculated cost,
    wherein activating the software license comprises activating the software license in the medical system based on the determination that the information is patient information.

7. The method of claim 6, wherein the medical system comprises a magnetic resonance system, a computed tomography scanner, or an ultrasound scanner.

8. The method of claim 6, wherein the software license is a trial license.

9. The method of claim 8, wherein utilization of software as a function of the trial license is limited including a limited time of use, a limited number of patients, a limited number of examinations, a limited type of use, or a limited number of analysis reports.

10. The method of claim 6, wherein the software license comprises a license for lease, a permanent license, or a service license.

11. The method of claim 6, wherein the software license is a general license and is operable to be activated as a trial license or a permanent license.

12. The method of claim 6, wherein the software license is operable to be activated by a training specialist or the client after receiving training for software corresponding to the software license.

13. The method of claim 12, wherein the training comprises training from the training specialist or computer based training.

14. The method of claim 6, wherein the software license is operable to be activated by the client, a vendor, the client and the vendor, or the medical system automatically.

15. The method of claim 6, wherein the software license is machine or system specific.

16. The method of claim 6, further comprising:
    renting or selling a connectable part of the medical system to the client, wherein a special software application is associated with the connectable part.

17. The method of claim 16, wherein a software license operable to execute the special software application is stored in the medical system.

18. The method of claim 6, further comprising:
    providing computer based training or a training specialist to the client after receiving the initial activation indication.

19. A method for activating a software license in a system, the method comprising:
    receiving a system, wherein the system includes a stored software license;
    receiving, by a processor of the system, information;
    determining, by the processor, that the received information is patient information; and activating, by the processor, the software license stored in the system based on the determination that the information is patient information, wherein activating the software license comprises activating a trial license with a limited utilization of an associated software application including limiting a number of patients, limiting a number of examinations, limiting the type of use, or limiting a number of analysis reports.

20. The method of claim 19, wherein receiving the system comprises receiving the system based on purchasing or renting the system.

21. The method of claim 19, wherein activating the software license comprises activating a general license as a trial license, a permanent license, a license for lease, or a service license.

22. The method of claim 19, wherein the software license comprises a plurality of stored software licenses, each of the software licenses is associated with a software application operable to be executed by the system.

23. The method of claim 22, wherein one of the software licenses is a license associated with a service or trouble shooting application, a trial license associated with an imaging application, or a permanent license associated with the imaging application.

24. The method of claim 19, wherein activating the software license comprises the client, a vendor, or the client and the vendor activating the software license.

25. The method of claim 19, wherein activating the software license comprises a training specialist or the system automatically activating the software license.

* * * * *